Sept. 30, 1958 H. E. PECK 2,853,937
APPARATUS FOR FRYING POTATOES, FISH, AND THE LIKE
Filed May 27, 1953 5 Sheets-Sheet 1

INVENTOR.
HENRY E. PECK
BY
ATTORNEY

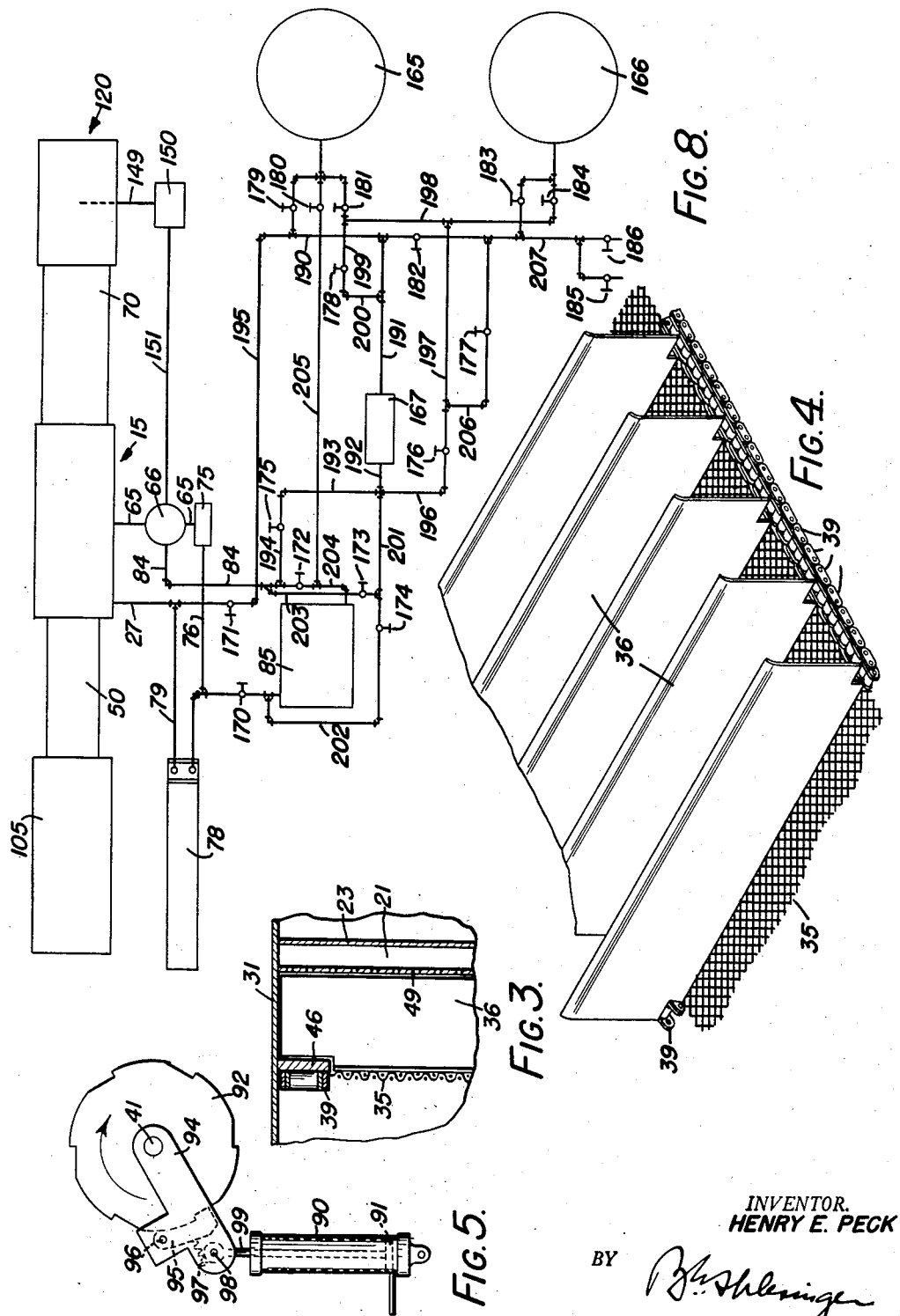

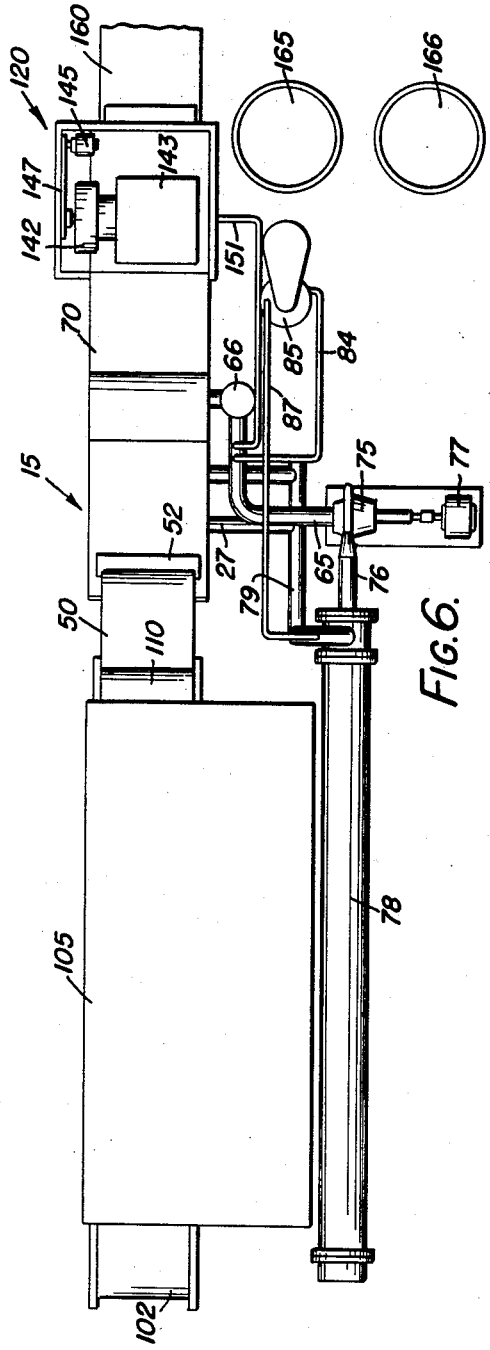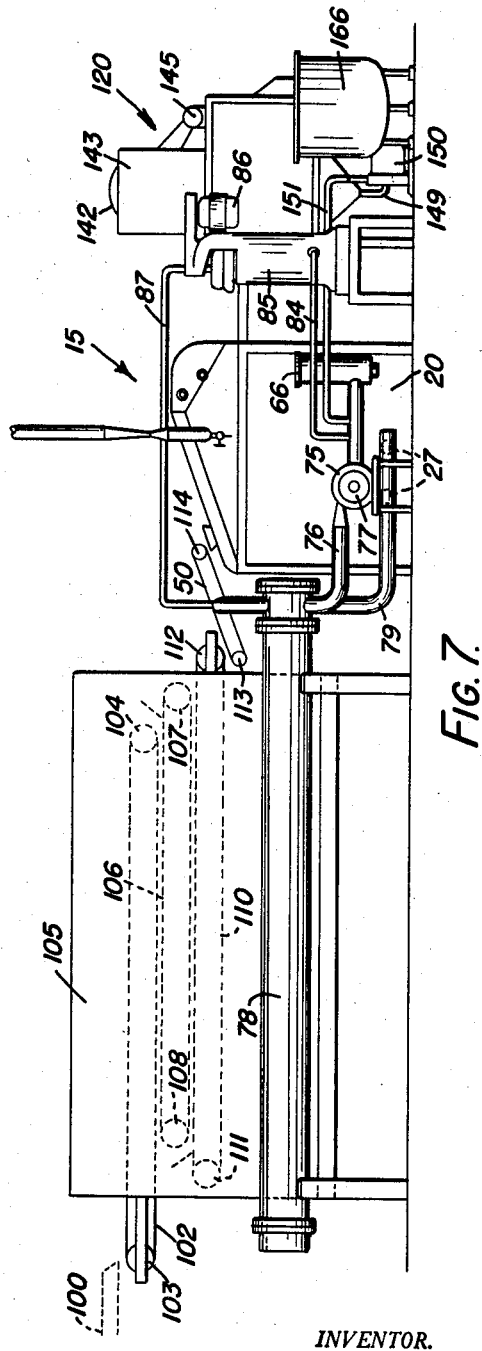

Sept. 30, 1958 H. E. PECK 2,853,937
APPARATUS FOR FRYING POTATOES, FISH, AND THE LIKE
Filed May 27, 1953 5 Sheets-Sheet 5
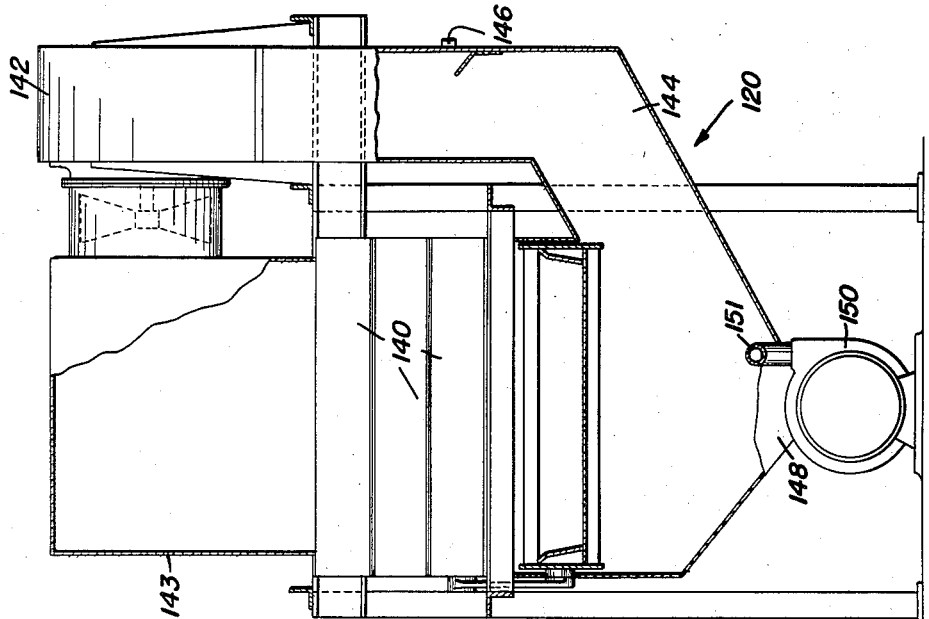
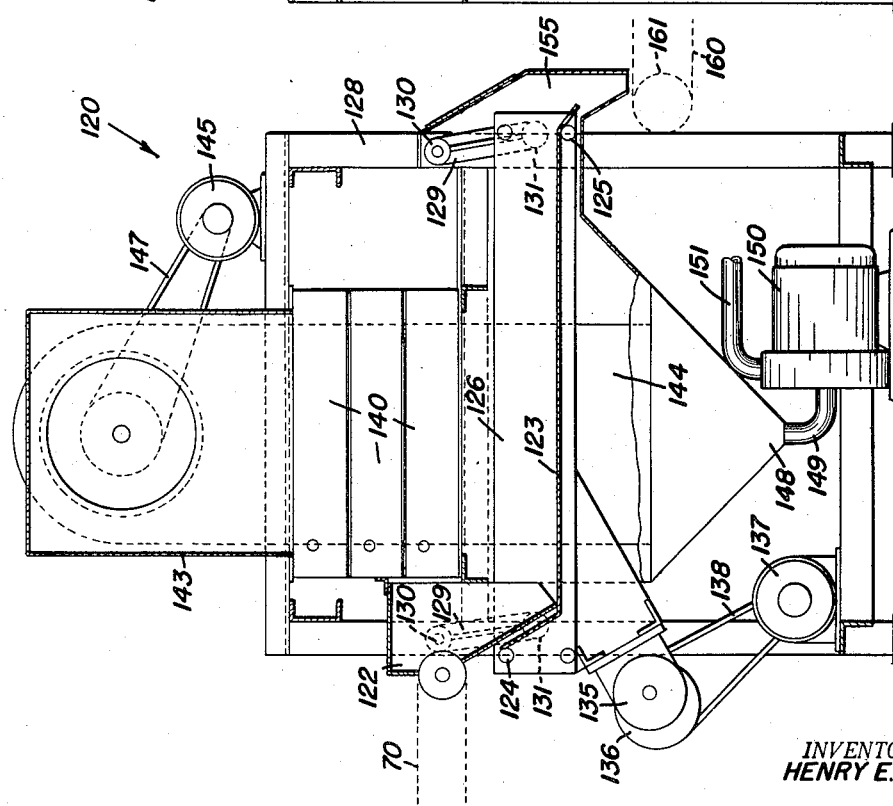
INVENTOR.
HENRY E. PECK
BY
ATTORNEY

United States Patent Office 2,853,937
Patented Sept. 30, 1958

2,853,937

APPARATUS FOR FRYING POTATOES, FISH, AND THE LIKE

Henry E. Peck, Fairport, N. Y., assignor to Frying Systems, Inc., Bridgeton, N. J., a corporation of New Jersey Application May 27, 1953, Serial No. 357,756

8 Claims. (Cl. 99—404)

The present invention relates to apparatus for frying food products and more particularly to apparatus for commercially frying potatoes and fish. In a still more specific aspect, the invention relates to apparatus for frying potatoes and fish commercially prior to deep freezing.

Ordinarily in commercially frying fish, potatoes or other deep fat fried products, a large, flat, open pan is used. The heat is applied to the frying medium conventionally by the use of an open gas or oil flame; and either the pan is supported on a refractory mounting that affords a radiant combustion chamber, or the flames are introduced into tubes which extend into the pan along the bottom of the pan and slightly off the bottom of the pan. In the latter case, the combustion gases are circulated through these fire tubes to heat the frying medium.

One main disadvantage in both former practices is the localized overheating of the frying medium in contact with the heat source. There is a great tendency for the shortening or oil to stratify into various heat zones with attendant damage to the frying medium. Overheating eventually alters the desirable characteristics of the frying medium immeasurably. This, in turn, adversely affects the finished product inasmuch as the shortening or oil remaining on the product after frying becomes an actual ingredient of the finished product. Any undesirable organoleptic change detracts, therefore, from the overall quality of the finished product be it potato chips, sticks, bakery products, or frozen fried products.

Aside from the disadvantage of stratification of the frying medium, there are other disadvantages with conventional frying apparatus. There is a known tendency for most products undergoing processing in deep fat to remain submerged in the frying medium for a period, usually only seconds, until actual moisture-evaporative temperature is reached, at which time the product floats in the frying medium. This tendency to float increases the time required to fry the food product since a large portion of the heat-receiving surface of the product is out of contact with the frying medium. It also increases the chances for contact of the food product with air and with the distillation products of the frying medium itself; and either is undesirable from the standpoint of quality maintenance in the finished product. Heretofore, therefore, rakes or other immersion and propulsion mechanisms have been employed which submerged the product being fried and at the same time attempt to move it through the pan. Since it is impossible for rakes or the like to move each piece of potato or fish or the like through the pan on a definite time basis, some pieces tend to eddy and remain overtime in the frying apparatus. This results in overcooking the product and in excessive absorption of oil or shortening by it.

One object of the present invention is to provide apparatus for frying French-fries, fish, and the like which will use the shortening with maximum efficiency.

Another object of the invention is to provide frying apparatus for the purpose described which will insure that each bit of the shortening or oil used in the process encounters the food product and gives its heat to the food product.

Another object of the invention is to provide frying apparatus of the character described which in operation will militate against polymerization of the shortening or oil and prolong its life.

Another object of the invention is to provide frying apparatus which will require a much smaller amount of shortening for commercially frying a given quantity of a given food product than is required in the long pans heretofore used for such purposes.

Another object of the invention is to provide frying apparatus that will achieve improved frying of potatoes, fish and the like.

A further object of the invention is to provide apparatus of the character described which will minimize oxidation of the shortening or oil during frying and will insure a better and more uniform quality of the finished product.

Another object of the invention is to provide frying apparatus in which the potatoes or fish are kept submerged in the oil or shortening for the period required to fry them and are prevented from floating to the top of the shortening.

Another object of the invention is to provide apparatus in which the penetration of the shortening into the potatoes or fish can be controlled by providing for a definite period of cooking, or travel of the food product through the shortening.

Another object of the invention is to provide apparatus of the character described in which the frying will be progressive.

A further object of the invention is to provide a frying unit in which the shortening can be continuously circulated through the frying equipment, maintained at a desired heat, continuously cleaned and reclaimed.

Another object of the invention is to provide a fully automatic installation for preconditioning the foodstuff, frying it, recovering the oil or shortening from the foodstuff after the frying operation is completed, and for reclaiming the oil or shortening.

Other objects of the invention will be apparent hereinafter from the specification and from the recital of the appended claims.

In the drawings:

Fig. 3 is a fragmentary section taken on the line 3—3 of Fig. 1 looking in the direction of the arrows and on a somewhat enlarged scale;

Fig. 4 is a fragmentary perspective view further illustrating the structure of the conveyor belt and its flights;

Fig. 5 is a detail view showing the means for advancing the conveyor belt step-by-step;

Fig. 6 is a plan view and Fig. 7 is a side elevation of a completely organized unit for processing potatoes and/or fish and related food products by the present invention;

Fig. 8 is a diagram illustrating the connection between the various units of this apparatus; and Figs. 9 and 10 are views taken at right angles to one another showing the apparatus for recovering the shortening.

The fryer of the present invention is denoted generally at 15. It comprises a base 20 which is formed internally with an inverted generally prismatic shaped tank 21. The converging front and rear walls of this tank are denoted at 22 and 23, respectively. The side walls 29 of the base 20 of the fryer constitute the side walls of the tank.

Figure 1:
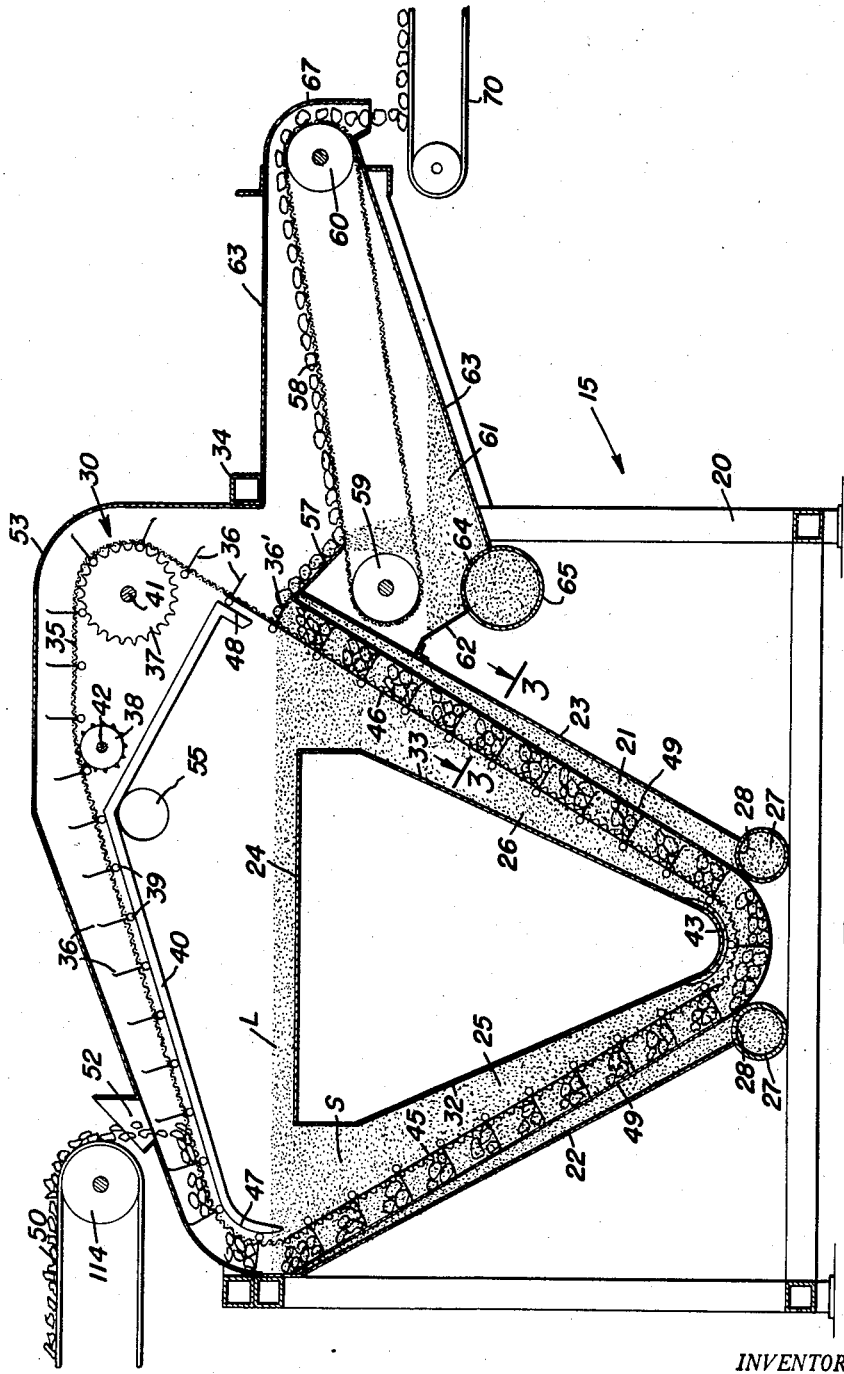
Fig. 1 is a vertical section through a fryer constructed according to one embodiment of the invention.

Removably mounted within the tank is a removable top section 30 (Fig. 2) having side walls 31 that are secured to a frame 34. This top section is of inverted generally prismatic shape and is adapted to be positioned in use, as shown in Fig. 1, in the tank 21. The top section comprises a separator 24 which extends from one lateral side wall 31 of the section 30 to the other. This separator is also of inverted generally prismatic shape but its front and rear walls 32 and 33 converge downwardly at a smaller angle than the angle of convergence of the front and rear walls 22 and 23 of tank 21. When the section 30 is in position in the tank, then, the separator 24 acts to divide the tank into two chambers or channels 25 and 26 which join at the bottom of the tank.

Figure 2:
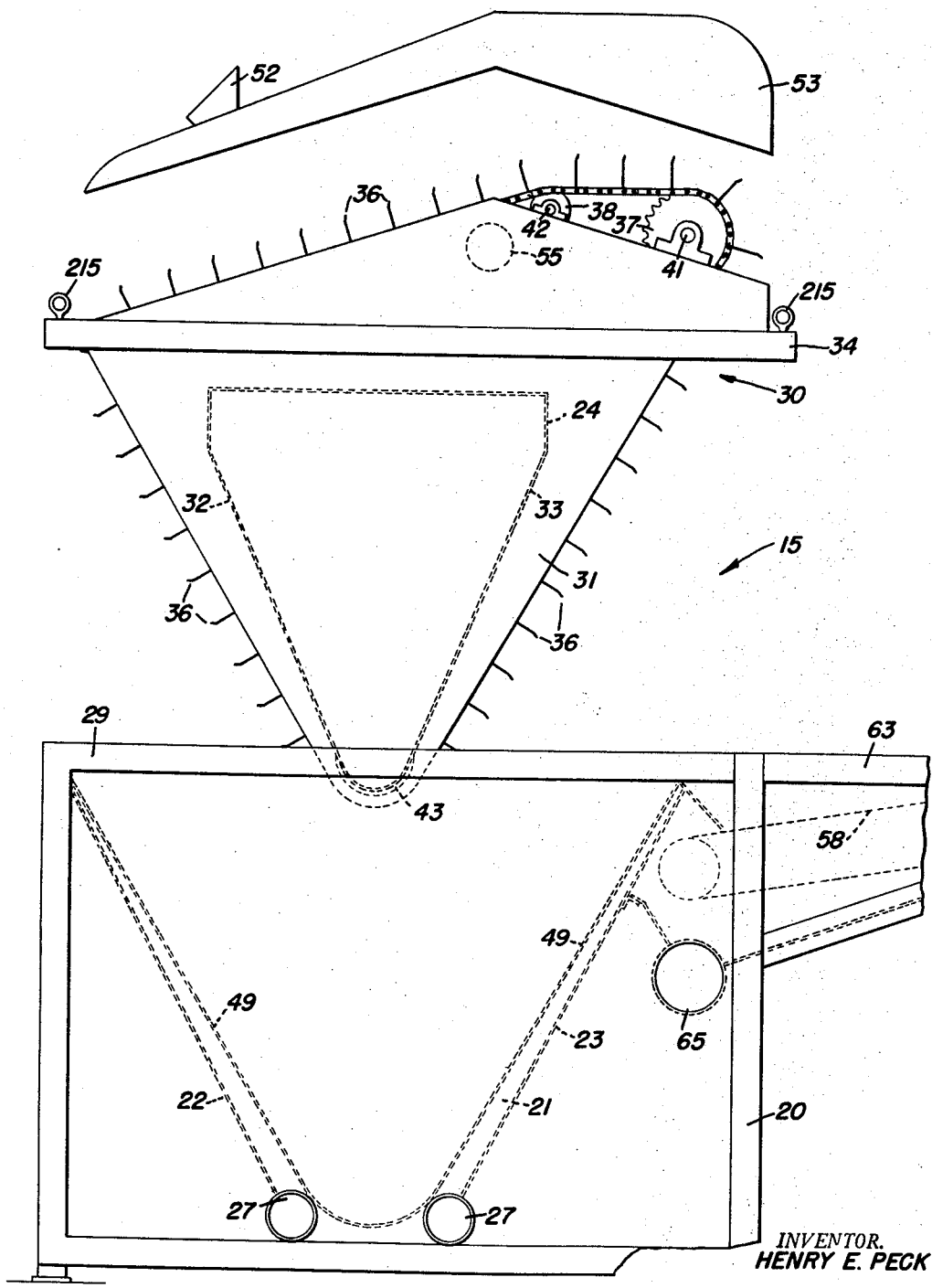
Fig. 2 is a view illustrating how the conveyor and associated parts can be removed from the frier for cleaning, after the cover has been removed.

Mounted above the separator 24 and in spaced relation thereto is a guide member 40. This guide member extends from one side 31 of section 30 to the other and when section 30 is mounted in the tank, the guide member 40 serves as a hood for the tank. Secured to the sides 31 of section 30 in inclined relation to the side walls 32 and 33 of the separator 24 are pairs of guide plates 45 and 46 (Figs. 1 and 3), respectively. These extend from a point adjacent the bottom of the separator to points slightly above the top thereof at either side thereof. The separator is provided at its bottom with an arcuate guide ridge 43. Secured to parallel shafts 41 and 42, which are journaled at opposite ends in the side walls 31 of section 30, are sprockets 37 and 38 (Fig. 2). Sprocket 37 is a drive sprocket and sprocket 38 is an idler.

The hood 40, guides 45 and 46, guide ridge 43 and sprockets 37 and 38 act as means for guiding and driving an endless chain-driven, foraminous belt conveyor 35 which is provided with a plurality of spaced flights 36 (Figs. 1, 2 and 4). The chain rollers of this conveyor are denoted at 39. The conveyor may be of conventional construction and has, therefore, been illustrated only diagrammatically. The rollers 39 are adapted to travel over sprockets 37 and 38, over hood 40, behind plates 45, over ridge 43, behind plates 46, and thence back to sprocket 37. Hood 40 is arcuately curved at its left hand or front edge, as denoted at 47 in Fig. 1, to deflect the rollers of the chain to pass from the top of hood 40 behind guides 45. Ridge 43 carries the chain smoothly over the bottom of the separator and from behind guides 45 to behind guides 46. The right hand or rear edge 48 of the hood 40 is parallel to guides 46 so that the rollers 39 of the chain can travel smoothly over this edge to sprocket 37.

As previously stated, in use the section 30 is mounted in the tank 21. The tank itself has a generally V-shaped foraminous screen 49 fixedly secured to it and extending from side to side of it. The legs of this screen are inclined to the walls 22 and 23 of the tank, but are parallel, respectively to the pairs of spaced guides 45 and 46 when section 30 is positioned in the tank. The legs of screen 49 act as guides, therefore, along which the tops of the flights 36 travel. Thus, the potatoes, fish, or other food products are held in the compartments formed by and between successive flights 36 as the conveyor travels through the tank.

The tank is adapted to be filled with liquid shortening or oil S to a level above the top of the separator or partition 24 as denoted at L (Fig. 1). The liquid shortening or oil is supplied to the tank through two pipes 27 which are mounted in the base of the fryer and which are perforated, as denoted at 28, on their upper sides to communicate with the tank.

The potatoes or fish or other food product to be fried are carried down into the tank and up out of the tank again by the endless conveyor 35. The belt itself of this conveyor is foraminous. It may be made of metal screen. However, the flights 36 are solid; they are not perforated. They may be made of stainless steel.

The potatoes or fish, which are to be fried, may be conveyed to the fryer upon an endless conveyor 50, as will be described further hereinafter, and dropped from that conveyor through a hopper 52 onto the conveyor 35. They are deposited in the spaces between successive flights 36 as the belt travels past the hopper 52. The hopper 52 is formed in the removable cover 53 of the tank. This cover may be made of sheet metal.

In the travel of the potatoes or fish through the tank they are fried. As the conveyor travels downwardly in channel 25, the flights 36 prevent the potatoes, fish, or other food product from rising in the tank and insure proper frying in the preliminary stage. As the conveyor travels upwardly in channel 26, the food product is also prevented by the flights 36 from rising to the top of the tank so that the finished frying is also properly done. The foraminous conveyor belt 35, and the foraminous screen 49 permit transverse passage of the hot shortening or oil through the compartments formed by successive flights 36, insuring maximum efficiency in use of the shortening. The cross circulation of the shortening insures that each bit of the frying oil encounters the food product in the compartment or pocket between successive flights 36 and gives its heat to the food product. This militates against polymerization of the oil and prolongs its life. It is to be noted that the temperature drop in the transverse passage of the shortening through the conveyor is much smaller than the temperature drop between one end of a conventional flat frying pan and the other. Therefore, there is greater efficiency in heat transfer from the shortening to the food product being fried. The shortening is kept continuously at the desired frying temperature by being circulated from the tank to a heat exchanger and back to the tank as will be described further hereinafter.

The penetration of the food product by the shortening is controlled by the rate of travel of the conveyor.

The steam driven off from the potatoes or fish, that are being fried, rises in the form of bubbles and collects in the vapor space under the hood 40. It is exhausted from that space through an exhaust pipe 55. The vapor under the hood prevents oxidation of the frying medium and insures a better appearance of the fried products.

The conveyor 35 is advanced preferably step-by-step, drive pulley 37 being driven step-by-step through a pneumatically operated indexing mechanism. This index mechanism comprises a cylinder 90, a piston 91 reciprocable in that cylinder, a ratchet wheel 92 which may be secured to the same shaft 41 as the drive sprocket 37, an arm 94 which is pivoted upon this shaft, and a pawl 95 which is pivoted in the arm 94 at 96 and which engages the ratchet wheel 92. The pawl 95 is held in engagement with the sprocket by a coil spring 97. The arm 94 is pivotally connected by means of pin 98 with the piston rod 99. A conventional reversing valve (not shown) which may be operated by the conveyor in its movement may control the operation of the piston 91. The step-by-step indexing of the belt is so that the flights may be loaded with the belt stationary.

The right hand wall 23 of the tank terminates at a point about level with the top of the partition 24, and below the level L to which the circulating pump tends to push the shortening. The shortening, therefore, flows out of the tank at the right hand side over the top of the wall 23. In its flow it washes off of each flight 36, as that flight reaches the position denoted at 36' in Fig. 1, the potatoes or fish, or other food product on that flight. The food product and the oil washing it off the flight flow over a plate 57 and drop onto an endless foraminous belt 58. This belt travels over sprockets 59 and 60 mounted on shafts that are journaled in base 20 and in a hood 63 that projects from the rear of the base 20. The oil or shortening carried over the plate 57 with the potatoes passes through the belt 58 and drops into a well 61 formed in the base 20 and bounded at front and rear by the walls 62 and 63 and on its sides by the lateral walls of the base. The belt 58 travels at slow speed and additional shortening will drip off the potatoes on the belt 58 into the well 61.

The shortening collecting in the well 61 is carried away from the fryer through an oil return pipe 65. This pipe has perforations 64 in its upper side inside well 61. It is through these perforations that the shortening flows from the well into the pipe. The conveyor belt 58 carries the fried potatoes or fish to a chute 67 whence the potatoes drop onto a take-away conveyor 70 which carries them to an oil-recovery unit which will be hereinafter described.

The belt 58 gives the shortening a chance to drain completely off the potatoes or fish before the air strikes them and congeals the shortening on them. The well 61 and the extension containing the belt 58 and chute 67 are in an atmosphere of steam which helps exclude the air. In fact, dry steam may be injected into this space to keep the air from entering it.

As already indicated, the oil or shortening is continuously circulated between the fryer and a heat exchanger, to maintain the desired frying temperature of the shortening. The shortening is pumped out of the fryer through the pipe 65 and a strainer 66 by means of a pump 75 (Figs. 6 and 7) which delivers it through the pipe 76 to the heat exchanger 78. This heat exchanger may be of conventional construction, and may be heated with steam only a few degrees above the temperature desired for the shortening. The shortening is returned to the fryer from the heat exchanger through the pipe 79 which connects with the pipes 27 (Fig. 1). Pump 75 is driven by a motor 77.

In order to keep the shortening pure, some of it is constantly delivered by pump 75 through a pipe 84 to a centrifuge 85. This centrifuge may be driven by the motor 86 (Fig. 7) and suitable belting. From the centrifuge the shortening returns to the system through the pipe 87 which connects with the heat exchanger 78.

Before the potatoes are fried, they are preferably passed through a pre-conditioner. Here they are surface dried rapidly in order to form a skin on their surfaces. This forms a barrier to penetration of the shortening, saving shortening and producing a better product. In this pre-conditioner, they are preferably air-dried. The potatoes may be delivered to the pre-conditioner from a vibrating feeder 100 (Fig. 7) of conventional construction. The feeder delivers the potatoes onto an endless belt 102 which carries them into the pre-conditioning chamber 105. Belt 102 runs over sprockets 103 and 104. From belt 102, the potatoes drop onto another endless belt 106 running in the reverse direction over sprockets 107 and 108. From belt 106 the potatoes drop onto a belt 110 running over sprockets 111 and 112 in the same direction as belt 102 runs and in the reverse direction to belt 106. Belt 110 delivers the potatoes onto belt 50 (Fig. 1) already mentioned. This belt runs over sprockets 113 and 114 (Fig. 7).

In order to recover as much as possible of the shortening from the potatoes after frying, the belt 70 is positioned to deliver the potatoes to an oil recovery unit denoted as a whole at 120 (Figs. 9 and 10). The belt 70 drops the potatoes into a chute 122 in this unit. They drop through the chute onto a stainless steel screen 123 which is mounted at one end on a rod 124 and at its opposite end rests upon a rod 125. These rods are secured in a vibrator 126 which may be of conventional construction and which is suspended from the frame 128 of the unit by parallel arms 129. These arms are pivoted at their upper ends on pivots 130 in the frame 128 and are pivotally secured to the vibrator 126 at their lower ends by pivots 131. The vibrator may be of conventional construction and may be actuated by an eccentric 135 which is mounted eccentrically of a pulley 136 that is driven from a motor 137 through the belt 138. The motor 137 is mounted in the base of the unit 120.

In the unit 120, the potatoes are passed through an atmosphere of hot air or steam to raise the temperature of the shortening and permit it to flow more freely off the potatoes, and the potatoes are vibrated rapidly so as to shake every possible bit of shortening from them.

The heating chamber of this oil-recovery unit is fully enclosed. Mounted above the vibrator are a series of steam heating coils 140. A conventional fan 142 driven by a motor 145 and belt 147 forces the air downwardly through an inlet box 143 over the heating coils 140 down through the potatoes and the vibrator screen and back through the duct 144 to the fan 142. If steam, instead of hot air, is used in the unit 120, the steam may be admitted to duct 144 through the inlet 146. The duct 144 is shaped at its lower end, as denoted at 148, to funnel the shortening, which is shaken off the potatoes and which drips off the potatoes, into a pipe 149 whence it is delivered to a pump 150 which is connected by the pipe 151 with the circulating pump 75 (Fig. 7).

The potatoes are delivered from the vibrating oil recovery unit 120 through a hopper 155 onto an endless belt 160 which travels at one end over a sprocket 161 and which delivers the potatoes to a freezing unit where they may be packaged and frozen for the market.

With the present invention, therefore, a complete system for pre-conditioning and frying potatoes or other foodstuffs, and for recovering the shortening is provided.

The shortening storage tanks 165 and 166 (Figs. 6 and 8) may be provided for use with the system. One of these is for storing make-up shortening and the other is for receiving the shortening when the system is drained for any reason. Pump 167 is used to transfer shortening from the make-up tank into the system and for transferring spent shortening from the system to the holding tank 166.

One way in which the various units can be connected is illustrated diagrammatically in Fig. 8.

In normal operation the manually-operable valves 170, 171, 172, 173, 174, 176, 177, 178, 180, 181, 182, 183, 184, 185 and 186 are closed. The pump 167 is therefore able to withdraw fat from the make-up tank 165 through the valve 179, the lines 190 and 191, and to deliver that liquid shortening through the lines 192, 193, open valve 175, and lines 194 and 84 into the circulatory system controlled by the pump 75.

When filling the system, the valves 173, 179, and 181 are open, the other valves being closed. This permits the pump 167 to pump oil from the make-up tank 165 through lines 190, 191, 192, 201, 203, and 84 into the system.

To deliver shortening from the system to the make-up tank 165, the valves 171, 176, and 181 are open; the other valves are closed. The pump 167 then pumps shortening from the system through the lines 195, 190, 191, 192, 196, 197, 198 and valve 181 into the tank 165.

To discharge shortening from the system, the valves 171, 176, and 184 are open; the other valves are closed. The shortening then flows from the system through the lines 195, 190, 191, pump 167, lines 192, 196, 197, and 198 and valve 184 into the fat holding tank 166.

For clarifying, the valves 174, 178, 184, 185, and 186 are open; the other valves are closed. Fat is then pumped from the holding tank 166 through the line 198, line 199, valve 178, line 200, and line 191, pump 167, line 192, line 201, valve 174, line 202 into the clarifier 85, and thence then through the line 204 and line 205, and valve 180 into the make-up tank 165.

For removing oil from the system, the valve 176, 177, 178, 184, 185 and 186 are open; the other valves are closed. In this case the shortening is pumped from the holding tank 166 through valve 184, line 198, line 199, valve 178, lines 200 and 191, pump 167, lines 192 and 196, valve 176, line 206, valve 177, line 207, and valves 185 and 186 to the drum or removal tank.

For rinsing the system, the valves 171, 176, 177, and 185 are open; the other valves are closed. The shortening then flows from the system through the valve 171, line 195, line 190, line 191, pump 167, lines 192 and 196, valve 176, line 206, valve 177 and line 207 and valve 185 to the drum or removal tank.

The operation of the apparatus will be understood from the preceding description but may briefly be summed up here. The sliced potatoes are first pre-conditioned by passing them through drier 105 to dry and seal their outer surfaces. Then they are delivered to the fryer; and in the fryer they are carried down into the hot oil or shortening and up out of it again by the conveyor 35, the hot oil or shortening being forced crosswise through the potatoes in the compartments bounded by successive flights of the conveyor, to properly pre-cook and finish cook the potatoes. Then the potatoes are washed off the conveyor 35 near the top of the upward reach of the conveyor by the overflowing oil and swept onto a conveyor belt which carries them to an oil-recovery unit 120 where the oil is shaken off them and also melted off them by hot air or steam. Then the potatoes are carried by a belt to the freezer or to the packaging machine. The oil in the fryer is kept continuously hot by being continuously circulated through a heat exchanger. Oil dripping off the potatoes and the oil used in washing them out of the conveyor belt 35 of the fryer is recovered and carried back into the heat exchanger-fryer system. The atmosphere of steam in the fryer prevents oxidation of the shortening or oil. A complete tie-up between fryer, clarifyer, oil-recovery unit, make-up and holding tanks permits complete freedom in effecting at any time whatever operations are required for efficient operation of the apparatus.

With the apparatus of the present invention, the potatoes are pre-dried, fried and delivered to a point for freezing and the fat is recovered and maintained at the desired temperature for frying, all automatically.

To clean out the fryer, the cover 53 is removed, and a block and tackle or other suitable hoisting means is attached to the eyes 215 (Fig. 2), that are screwed into frame 34, and the whole assembly 30 comprising conveyor 35, hood 40, guides 45 and 46, and separator 24, is lifted out of tank 15. Access is then had to screen 49 and to the tank.

While the invention has been described in connection with a specific embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Apparatus for cooking foodstuffs which have in their normal raw state a substantial liquid content, comprising a container adapted to be filled with a hot cooking liquid, said container having opposed walls which converge downwardly to its bottom and which form with said bottom a receptacle for the reception of said cooking liquid, a partition member secured in said container and having opposed, downwardly converging walls which are disposed in spaced relation to the opposed downwardly converging walls of said container and to the bottom of said container and which form with said container a continuous channel which descends from a loading zone at the top of said container at one side thereof to the bottom of said container and thence to a discharge zone at the top of said container at the opposite side thereof, a continuous conveyor, means for actuating the conveyor to move foodstuffs through said channel, said conveyor being provided with a plurality of spaced flights dividing it into compartments for the foodstuffs, said loading zone being higher than said discharge zone, and means for pumping hot cooking liquid continuously into said container to a level to overflow said container at the said discharge zone, whereby to wash said foodstuff out of the compartments of the conveyor as they successively reach the discharge zone.

2. Apparatus for cooking foodstuffs which have in their normal raw state a substantial liquid content, comprising a container adapted to be filled with a hot cooking liquid, said container having opposed walls which are sloped to converge downwardly to a relatively narrow bottom and which form with said bottom a receptacle for the reception of hot cooking liquid, a partition member secured in said container and having walls disposed in spaced relation to the opposed walls of said container and to the bottom of said container and forming with said container a continuous channel which descends from a loading zone at the top of said container at one side thereof to the bottom of said container and thence to a discharge zone at the top of said container at the opposite side thereof, means for supplying hot cooking liquid to said container adjacent the bottom of said sloped walls, a foraminous plate mounted in said channel, a continuous conveyor movable through said channel, said conveyor being provided with a plurality of imperforate, spaced flights dividing it into compartments for the foodstuffs, each compartment having a foraminous bottom, the tops of said flights contacting said foraminous plate as the conveyor moves through said channel to retain the foodstuff in each compartment, and means for causing the cooking liquid to move transversely through said compartments over substantially the entire submerged length of said conveyor as the conveyor moves through said channel.

3. Apparatus for cooking foodstuffs which have in their normal raw state a substantial liquid content, comprising a container adapted to be filled with a hot cooking liquid, a partition member secured in said container and having walls disposed in spaced relation to opposed walls of said container and to the bottom of said container and forming with said container a continuous channel which descends from a loading zone at the top of said container at one side thereof to the bottom of said container and thence to a discharge zone at the top of said container at the opposite side thereof, a foraminous plate mounted in said channel, a continuous conveyor movable through said channel, said conveyor being provided with a plurality of imperforate, spaced flights dividing it into compartments for the foodstuffs, each compartment having a foraminous bottom, the tops of said flights contacting said foraminous plate as the conveyor moves through said channel to retain the foodstuff in each compartment, said loading zone being higher than said discharge zone, and means for pumping hot cooking liquid continuously into said container to a level to overflow said container at said discharge zone, whereby to wash said foodstuff out of the compartments of the conveyor as they successively reach the discharge zone.

4. Apparatus for cooking foodstuffs, comprising a container adapted to be filled with a hot cooking liquid, said container having opposed walls which converge downwardly of the container, a partition member secured in said container in spaced relation to the opposed walls of said container and to the bottom of said container and having side walls which converge downwardly, said partition member forming with said container a continuous channel which descends from a loading zone at the top of said container at one side thereof to the bottom of said container and thence to a discharge zone at the top of said container at the opposite side thereof, a generally V-shaped foraminous plate mounted in said channel, an endless belt type conveyor having a foraminous bottom and a plurality of spaced flights, said conveyor being disposed in said channel so that the tips of said flights contact said foraminous plate as the conveyor moves through said channel, means for actuating said conveyor, and means for causing the cooking liquid to move transversely of the spaces between successive flights of the conveyor as the conveyor moves through said channel.

5. Apparatus for cooking foodstuffs, comprising a container adapted to be filled with a hot cooking liquid, said container having opposed walls which converge downwardly of the container, a partition member secured in said container in spaced relation to the opposed walls of said container and to the bottom of said container and having side walls which converge downwardly, said partition member forming with said container a continuous channel which descends from a loading zone at the top of said container at one side thereof to the bottom of said container and thence to a discharge zone at the top of said container at the opposite side thereof, a generally V-shaped foraminous plate mounted in said channel, an endless belt type conveyor having a foraminous bottom and a plurality of spaced flights, said conveyor being disposed in said channel so that the tips of said flights contact said foraminous plate as the conveyor moves through said channel, means for actuating said conveyor, said loading zone being above said discharge zone, and means for pumping hot cooking liquid continuously into said container to a level which overflows at the discharge zone of the container, whereby the overflowing liquid will wash the foodstuff off successive flights as the flights successively pass the discharge zone in the travel of the conveyor.

6. Apparatus for cooking foodstuffs comprising a container adapted to be filled with a hot cooking liquid, said container having opposed walls which converge downwardly of the container, a partition member secured in said container in spaced relation to the opposed walls of said container and to the bottom of said container and having side walls which converge downwardly at approximately the same angle of convergence as said opposed walls of said container, said partition member forming with said container a continuous channel which descends from a loading zone at the top of said container at one side thereof to the bottom of said container and thence to a discharge zone at the top of said container at the opposite side thereof, a generally V-shaped foraminous plate mounted in said channel and having its legs converging downwardly at a different angle from said opposed walls of said container, guide rails secured in said container to project into the descending and ascending portions of said channel, said guide rails being disposed parallel to the legs of said foraminous plate, a hood mounted over said container, an endless belt type conveyor having a foraminous bottom and a plurality of spaced flights, said conveyor being disposed in said channel to travel on said guide rails and over said hood and over the bottom end of said partition member and so that the tips of said flights contact said foraminous plate as the conveyor moves through said channel, means for actuating said conveyor, and means for causing the cooking liquid to move transversely of the spaces between successive flights of the conveyor as the conveyor moves through said channel.

7. Apparatus for frying foodstuff comprising a container having a channel therein which extends downwardly and then upwardly and which is adapted to hold a hot cooking liquid, a conveyor for conveying the foodstuff to be fried through said channel from a loading zone at one side of said container to a discharge zone at the opposite side thereof, said loading zone being higher than said discharge zone, said conveyor having a plurality of flights spaced in the direction of its movement, means for pumping cooking liquid into said channel to a level above said discharge zone whereby the overflow of liquid from said channel at said discharge zone will wash foodstuff off the flights of the conveyor as each passes the discharge zone successively, thereby to effect discharge of the fried foodstuff, an endless foraminous conveyor disposed to catch the discharged foodstuff and permit the cooking liquid to drain therefrom, a heat exchanger, and means for collecting the liquid washing over into the discharge zone and the liquid draining from the discharged foodstuff and for pumping said collected liquid to said heat exchanger, and means for pumping liquid from said heat exchanger back to said channel.

8. Apparatus for frying foodstuff comprising a container having a channel therein which extends downwardly and then upwardly and which is adapted to hold a hot cooking liquid, a conveyor for conveying the foodstuff to be fried through said channel from a loading zone at one side of said container to a discharge zone at the opposite side thereof, said loading zone being higher than said discharge zone, said conveyor having a plurality of flights spaced in the direction of its movement, means for pumping cooking liquid into said channel to a level above said discharge zone whereby the overflow of liquid from said channel at said discharge zone will wash foodstuff off the flights of the conveyor as each passes the discharge zone successively, thereby to effect discharge of the fried foodstuff, an endless foraminous conveyor disposed to catch the discharged foodstuff and permit the cooking liquid to drain therefrom, a heat exchanger, and means for collecting the liquid washing over into the discharge zone and the liquid draining from the discharged foodstuff and for pumping said collected liquid to said heat exchanger, and means for pumping liquid from said heat exchanger back to said channel, and means for creating an atmosphere of steam around said foraminous conveyor to prevent the cooking liquid from congealing on the discharged foodstuff.

References Cited in the file of this patent

UNITED STATES PATENTS

| Number | Name | Date |
|---|---|---|
| 550,033 | Wheeler | Nov. 19, 1895 |
| 1,234,131 | Cleveland | July 24, 1917 |
| 1,236,405 | Cleveland | Aug. 14, 1917 |
| 1,440,663 | Dunn | Jan. 2, 1923 |
| 1,516,962 | Gunsolley | Nov. 25, 1924 |
| 1,518,206 | Kramer | Dec. 9, 1924 |
| 1,641,262 | Fontaine et al. | Sept. 6, 1927 |
| 1,644,516 | Ehrhart | Oct. 4, 1927 |
| 1,666,019 | McCarthy | Apr. 10, 1928 |
| 1,952,418 | Chapman | Mar. 27, 1934 |
| 2,101,506 | Morrow et al. | Dec. 7, 1937 |
| 2,106,156 | Munro | Jan. 25, 1938 |
| 2,177,166 | Bemis | Oct. 24, 1939 |
| 2,208,875 | Lagaard | July 23, 1940 |
| 2,286,644 | Pringle et al. | June 16, 1942 |
| 2,319,561 | Scharsch | May 18, 1943 |
| 2,360,100 | Bowen | Oct. 10, 1944 |
| 2,538,937 | Foster | Jan. 23, 1951 |
| 2,546,163 | Mcbeth | Mar. 27, 1951 |

FOREIGN PATENTS

| Number | Country | Date |
|---|---|---|
| 485,307 | Great Britain | May 18, 1938 |
| 639,895 | Great Britain | July 5, 1950 |